United States Patent Office 2,778,722
Patented Jan. 22, 1957

2,778,722
DEFLUORINATION OF PHOSPHATE ROCK

Clinton A. Hollingsworth, Lakeland, Fla., assignor to Smith-Douglass Company, Incorporated, Norfolk, Va., a corporation of Virginia No Drawing. Application January 19, 1954,
Serial No. 405,023

3 Claims. (Cl. 71—44)

This invention relates to the defluorination of phosphate rock and similar natural phosphatic materials, and has for its object the provision of an improved method of defluorinating such materials by calcination.

Fluorine is present in practically all natural phosphate rocks, in amount varying in the different areas in which the rock occurs. The common Florida phosphate rocks (e. g. pebble rock) usually contain from 3.5 to 4% of fluorine. The fluorine is believed to be present as calcium fluoride ($CaF_2$) and also combined with tricalcium phosphate as calcium fluorphosphate or fluorapatite ($Ca_{10}F_2(PO_4)_6$), and this combination is believed to be largely responsible for the low phosphate availability of the raw rock as a fertilizer. Moreover, the high fluorine content of the raw rock makes it unsuitable as a mineral supplement in animal feed.

There have been many proposals for defluorinating phosphate rock by calcination. Such calcination is complicated by the fact that the temperature required for volatilizing the fluorine and for producing a tricalcium phosphate of high fertilizer availability is close to the temperature at which the rock softens and fuses or sinters, and hence satisfactory and efficient calcination is practically impossible, unless the temperature is sufficiently high to completely fuse the rock. For the most part, the aim of the prior proposals has been to increase the refractoriness of the calcining charge by mixing the phosphate rock with one or more additive agents for raising the fusion temperature of the resultant mixture by coating the particles of the phosphate rock or by reacting therewith to form compounds of higher fusion temperature than the rock itself. The additive agents, even when effectively increasing the refractoriness of the calcining charge, lower the grade (i. e. the phosphate content, commonly determined as $P_2O_5$) of the calcined product, and moreover increase the cost of calcination by the cost of the agents themselves and the cost of mixing them with the rock.

The aim of the present invention is to condition the rock and loosen the fluorapatite lattice so that the rock can be defluorinated by calcination without substantial fusion and in the absence of any additive agent for increasing the refractoriness of the rock during calcination. I have found that the fluorapatite lattice is broken or loosened by treatment of the rock with an aqueous solution of hydrochloric acid (HCl). I have moreover found that when the fluorapatite lattice is thus broken or loosened, fluorine is more readily eliminated by calcination, and substantially complete defluorination can be effected at a lower temperature than otherwise possible. Furthermore, due to the greater ease of fluorine elimination, the residual fluorine in the rock as the calcining temperature progressively increases is less than when an unconditioned raw rock is subjected to the same calcining treatment, and where the rock is of low silica content (i. e. not exceeding 4%), such lower residual fluorine permits increasing the calcining temperature to 2600° F. and higher, without substantial fusion, which high temperature is necessary to convert the tricalcium phosphate to the alpha-modification having high fertilizer availability.

Based on the foregoing discoveries, the present invention involves treating the rock with an aqueous solution of hydrochloric acid of sufficient strength to loosen the fluorapatite lattice. To this end, the aqueous solution should contain at least about 10% by weight of hydrogen chloride (HCl) based on the combined dry weight of the rock and HCl content of the aqueous solution. The treated rock is subjected to a drying operation in the course of which more than half of its hydrochloric acid content is volatilized, and preferably recovered. Drying may advantageously be carried out at a temperature of about 500° F., and more generally the drying temperature may be within the range of 200 to 800° F. The dried rock is then calcined without substantial fusion and in the presence of water vapor at a temperature sufficiently high to eliminate substantially all of the fluorine, generally within the range of 2400 to 2700° F. When it is desired that the tricalcium phosphate possess high fertilizer availability, the calcining temperature should be at least 2500° F., and more preferably around 2700° F.

The treatment of the phosphate rock with hydrochloric acid is in the nature of a conditioning step to prepare the rock for more ready defluorination by calcination. Relatively large amounts of hydrochloric acid are required to loosen the fluorapatite lattice, but not such an amount as to dissolve the phosphate. To this end, the amount of hydrochloric acid used in treating the rock should be at least 10% by weight of hydrogen chloride (HCl) based on the combined dry weight of the rock and the hydrogen chloride content of the hydrochloric acid, and preferably is around 20–25% and even up to 30%, on the same basis. The treatment of the rock with hydrochloric acid, usually in the form of an aqueous solution to promote wet mixing, can be carried out in any suitable type of apparatus, such as a vat or the like, and advantageously may be effected in much the same way that phosphate rock is presently treated with sulphuric acid in preparing superphosphate. The treatment is carried out at room temperature, and the rock and acid are thoroughly and intimately mixed. Contact of the rock with the acid should be sufficiently long to complete the reactions and establish a condition of equilibrium. Usually, this requires several hours, and preferably at least 24 hours (1 day) up to as long as 5 days. Experience to date in practicing the invention indicates that when several days (up to 5) are taken for the conditioning treatment, before drying, the dried rock has less tendency to fuse or sinter during calcination.

Some fluorine is evolved in the course of the treatment of the rock with hydrochloric acid, and the larger the weight of hydrogen chloride with respect to the weight of rock undergoing treatment, the greater will be the amount of fluorine evolved. Hence, in large scale operations, and especially where relatively large weights of hydrogen chloride are used, suitable provision should be made for recovering the evolved fluorine. The precise action of the hydrochloric acid in loosening the fluorapatite bond is not entirely understood, but to some extent, it is believed, chlorine replaces fluorine and a corresponding amount of chlorapatite is formed, from which chlorine is readily evolved at a comparatively low temperature. In any event, the conditioning of the rock with hydrochloric acid promotes removal of some fluorine by heat-treatment at temperatures contemplated in the subsequent drying step, and facilitates substantially complete defluorination by calcination, at lower temperatures than required with unconditioned rock.

Drying of the rock may be carried out in any suitable type of drying oven, kiln or furnace, preferably of the retort or muffle type where recovery of chlorine, and fluorine, is contemplated. Usually, for economical reasons, both chlorine and fluorine should be recovered. The gases evolved during drying, consisting for the most part of hydrogen chloride, hydrogen fluoride and water vapor where the drying apparatus is conducted in a retort or muffle, may be condensed or absorbed in any suitable medium such as water or sulphuric acid, conveniently in an apparatus of the tower type. For example, the gases may be passed upwardly through a tower in contact with concentrated sulphuric acid, the hydrogen chloride passing through the tower and being appropriately condensed, while the hydrogen fluoride is absorbed in the sulphuric acid and may be recovered therefrom by distillation.

Drying is most advantageously carried out at an ultimate temperature of about 500° F., and until the hydrogen chloride (HCl) content of the dried rock is less than half the amount initially admixed with the rock. At lower drying temperatures, a longer time is required for drying and volatilization of hydrogen chloride is less efficient; so that it is uneconomical to use a drying temperature lower than 200° F., while a temperature in excess of 800° F. is unnecessary for drying. During drying, caking and agglomeration usually take place, so that the conditioned and dried rock should be crushed and screened preparatory to calcination. Screening to about all through a 14 mesh standard Tyler screen generally gives satisfactory results for calcination in a rotary kiln.

The ultimate temperature of calcination will depend upon the use to which the defluorinated calcine is to be put. When intended solely as a mineral supplement for animal feed, the calcining temperature need be only high enough (e. g. at least 2400° F.) to reduce the fluorine to the amount prescribed as non-toxic by the commercial standard, which presently is one part of fluorine per 100 parts of phosphorus. With a phosphate product analyzing about 40% $P_2O_5$, the fluorine content should not exceed 0.17% to meet this standard. If the defluorinated calcine is to be used as a fertilizer, a calcining temperature lower than about 2500° F. is inadequate to impart high fertilizer availability to the tricalcium phosphate, and hence for such use the calcining temperature should be at least 2500° F. and preferably about 2700° F. To withstand this high temperature without objectionable fusion, in the absence of any additive agent for increasing the refractoriness of the rock during calcination, the silica content of the rock should not exceed 4%, and preferably should be not higher than 3% determined as insolubles (insol.).

Calcination may be carried out, in the presence of water vapor, in any suitable apparatus, such as a rotary kiln, electric furnace, shaft furnace etc. In whatever apparatus employed, intimate and continuous association of the water vapor with the entire body or charge of phosphatic material undergoing calcination is necessary. The defluorinated product, when calcined at a temperature of at least 2500° F. to impart high fertilizer availability thereto, must be cooled rapidly, as for example by quenching with water, to prevent reversion of the citrate soluble form of the tricalcium phosphate (alpha) to the citrate-insoluble form (beta).

In practicing the invention, the phosphate rock is thoroughly mixed with the hydrochloric acid, and the mixture may be delivered to a storage bin or the like. Usually, the mixture is dried at a temperature within the range of 400 to 800° F. The gaseous product evolved during drying is passed through an absorber for hydrochloric acid, and the hydrochloric acid recovered in the absorber is reused for treating fresh rock. The dried product may be delivered to storage prior to defluorination by calcination in the presence of water vapor, preferably at a temperature of about 2700° F. The gaseous product of the calcining operation contains hydrofluoric acid and hydrochloric acid gas and these are selectively recovered, the hydrochloric acid being reused for treating fresh rock, and the hydrofluoric acid being marketable as such. Generally, the dryer feed will contain (on a dry basis) from 70 to 90% of phosphate rock and from 30 to 10% of hydrogen chloride (HCl); and the defluorinating kiln feed will contain from 90 to 98% phosphate rock and from 10 to 2% of hydrogen chloride. The calcined product from the defluorinating kiln will contain less than one part of fluorine per 100 parts of phosphorus, or less than 0.15% fluorine for a calcined product with a $P_2O_5$ content of around 38%.

The following examples illustrate actual practices of the invention and the effects (1) of different amounts of hydrochloric acid, (2) of different defluorinating temperatures, and (3) of phosphate rock feeds of different sizes. The feeds were prepared by mixing various percentages (based on the combined dry weight of rock and hydrogen chloride) of a 36% aqueous solution of hydrochloric acid with the phosphate rock. The mixtures of acid and rock were dried at a temperature of about 600° F. The dried product was crushed and screened to all passing a 14 mesh Tyler standard screen. In drying, a large portion (more than half) of the added hydrogen chloride was volatilized and recovered, and in the examples this is reported in terms of chlorine (Cl). Calcination was carried out in an atmosphere of water vapor for the indicated detention periods at the indicated temperatures, 20 minutes being allowed to bring the feed up to the indicated calcining temperature. For comparison, a feed of raw rock was calcined under the same conditions. In the examples of Table I, the phosphate rock was ground to about 85% minus 150 mesh. The chemical analysis of the rock in all examples was as follows:

| $P_2O_5$, percent | Insol., percent | $Fe_2O_3$, percent | $Al_2O_3$, percent | CaO, percent | Fl, percent |
|---|---|---|---|---|---|
| 35.15 | 3.06 | 1.59 | 0.73 | 49.83 | 3.96 |

*Table I*

| Feed Composition | Raw Rock | Ex. 1 | Ex. 2 | Ex. 3 |
|---|---|---|---|---|
| Percent HCl added to feed | | 10 | 20 | 25 |
| Percent Cl left in dry feed | | 4.45 | 8.79 | 6.14 |
| Percent Cl evolved in drying | | 55.5 | 56.1 | 75.4 |
| 30 minutes at 2,700° F.: | | | | |
|   Percent F (in calcine) | 0.55 | 0.02 | 0.006 | 0.006 |
|   Percent Cl (in calcine) | | 0.57 | trace | trace |
|   Percent $P_2O_5$ (in calcine) | | 38.59 | 38.20 | 38.20 |
|   Percent Citrate $P_2O_5$ | | 32.59 | 32.51 | 33.50 |
|   Percent .4% HCl $P_2O_5$ | | 38.48 | 38.16 | 37.92 |
| Percent F (in calcine) after: | | | | |
|   20 minutes at 2,700° F | 0.63 | 0.45 | 0.24 | 0.05 |
|   10 minutes at 2,700° F | 0.95 | 0.80 | 0.59 | 0.39 |
|   30 minutes at 2,600° F | 0.68 | 0.30 | 0.18 | 0.13 |
|   30 minutes at 2,500° F | 1.36 | 1.20 | 0.48 | 0.26 |

In the examples of Table II, the phosphate rock was unground, which herein is to be understood as substantially all minus 14 mesh and on 150 mesh. The actual screen analysis of the unground phosphate rock concentrate used in the examples was as follows:

| +20 mesh | −20+35 mesh | −35+65 mesh | −65+150 mesh | −150 mesh |
|---|---|---|---|---|
| Percent 4.4 | Percent 10.9 | Percent 22.2 | Percent 60.7 | Percent 1.8 |

*Table II*

| Feed Composition | Raw Phos. | Ex. 4 | Ex. 5 | Ex. 6 |
|---|---|---|---|---|
| Percent added to Feed | | 10.0 | 20.0 | 25.0 |
| Percent Cl left in dry feed | | 2.85 | 5.75 | 6.40 |
| Percent Cl evolved in drying | | 72.0 | 71.4 | 74.1 |
| 30 minutes at 2,700° F.: | | | | |
|   Percent F (in calcine) | 0.88 | 0.78 | 0.40 | 0.04 |
|   Percent Cl (in calcine) | | | | 0.40 |
|   Percent $P_2O_5$ (in calcine) | | | | 38.58 |
|   Percent Citrate $P_2O_5$ | | | | 33.96 |
|   Percent 0.4 percent HCl $P_2O_5$ | | | | 38.58 |
| Percent F (in calcine) after: | | | | |
|   20 minutes at 2,700° F | 1.44 | 1.15 | 0.93 | 0.31 |
|   10 minutes at 2,700° F | 1.90 | 1.55 | 1.45 | 0.78 |
|   30 minutes at 2,600° F | 1.68 | 1.08 | 1.03 | 0.53 |

The amount of hydrochloric acid (chlorine) evolved in the drying operation depends primarily on the time and temperature of the operation, and also on the amount of excess lime present in the phosphate rock. The excess or free lime is that in excess of the amount required to theoretically form tricalcium phosphate ($3CaO \cdot P_2O_5$) and dicalcium silicate ($2CaO \cdot SiO_2$) with all of the phosphorus, calcium and silicon in the rock. The presence of water vapor in the final stages of drying aids in the removal of hydrochloric acid.

The drying operation may be conducted in situ with the defluorinating operation (i. e. without cooling, crushing and sizing between drying and calcining), since substantially all of the hydrochloric acid will be volatilized before the charge reaches the defluorination temperature. However, it is generally advantageous to carry out drying and calcination as separate operations, since lumps formed during drying can be crushed, and the crushed product sized by screening ahead of the defluorination operation. While drying temperatures in excess of 800° F. are unnecessary, it may be advantageous in some instances to carry out the drying operation as the first stage of a two-stage defluorination calcination, where temperatures up to 2200° F. may be employed.

The defluorinated calcines are relatively soft and friable, indicative of good kiln operation. The conditioning treatment with hydrochloric acid substantially eliminates the tendency of the phosphate rock to shrink during calcination. Shrinkage during calcination greatly hinders defluorination because it closes the pores through which water vapor penetrates the body of the charge, and in prior defluorinating practices often prevents substantially complete elimination of fluorine.

Optimum results are obtained with ground phosphate rock, as will be noted from the foregoing tables. It is believed that the superior results obtained with ground rock is due primarily to the fact that a larger portion of the fluorapatite lattice is contacted with hydrochloric acid, whereas when the rock is unground only the outer surfaces of the phosphate particles are so contacted, thus leaving the innermost part of the particles uncontacted, and it is the innermost part of the particle that needs to have the apatite bond loosened. This is particularly true when the acid addition is at or near the lower limits of the effective range. This difference in result between ground and unground phosphate decreases as the acid addition is increased.

The silica content of the phosphate rock is important and for optimum results should be at least 1.8% and not exceed 4%. Some silica is required for efficient defluorination, and if it is not present objectionable fusion takes place during calcination, probably because the unliberated fluorine acts like a flux. With a silica content of from 1.8 to 4%, calcination of the conditioned rock can be carried out without substantial fusion. With phosphate rocks containing more than 4% of silica and/or excessive amounts of ferric oxide or other impurities which tend to promote fusion, additive agent may be required for increasing the refractoriness of the calcining charge. This can generally be satisfactorily effected by chemical balancing, that is by proportioning the phosphorus, calcium and silicon contents of the calcining charge to theoretically form tricalcium phosphate ($3CaO \cdot P_2O_5$) and dicalcium silicate ($2CaO \cdot SiO_2$).

Where, as in the method of the invention, the apatite bond is loosened prior to calcination, slightly higher silicas (insols) are permissible than in methods where the apatite bond is broken during calcination. In view of the amount of calcium carbonate usually present in Florida phosphate rocks, an insol of about 4–4.5% is normally required to theoretically form tricalcium phosphate and dicalcium silicate of the $P_2O_5$, $CaO$ and $SiO_2$ in the rock. Such rocks are naturally chemically balanced, and with such rocks the insol may be as high as 4.8% without causing objectionable fusion, particularly at the lower calcining temperatures contemplated in the practice of the invention.

In some instances it is advantageous to add $P_2O_5$ (e. g. as phosphoric acid) to the calcining charge to theoretically form tricalcium phosphate with the excess lime in the phosphate rock in order to prevent the formation of calcium chloride during conditioning, rather than for increasing the refractoriness of the calcining charge. Such addition of $P_2O_5$ also results in a higher recovery of hydrochloric acid in the drying operation. Again, in some instances, fertilizer availability can be increased by adding to the raw rock such small amount of $P_2O_5$ as is required to balance the excess lime and theoretically form tricalcium phosphate and dicalcium silicate with all of the phosphorus, calcium and silicon in the raw rock.

While for inclusion in animal feed as a mineral supplement, the fluorine content of the calcined rock should not exceed one part for each 100 parts of phosphorus, higher fluorines are permissible where the calcined rock is to be used as a plant fertilizer. Tests conducted by the United States Department of Agriculture have shown that a phosphate rock defluorinated by calcination and having a neutral ammonium citrate availability of 75% is equivalent to and the equal of (for fertilizer purposes) superphosphate having close to 100% neutral ammonium citrate availability. The U. S. D. A. tests further show that phosphate rock refluorinated by calcination having neutral ammonium citrate availabilities of at least 75% yield fertilizer results superior to superphosphate. Calcines produced in accordance with the invention having fluorine contents not exceeding 0.5% have a $P_2O_5$ solubility in neutral ammonium citrate of at least 75%, and hence are suitable for fertilizer purposes, and are considerably cheaper to produce than calcines having fluorine contents of 0.15% and less.

As will be observed from the foregoing tables, the fluorine content of the calcine can be controlled by (1) the amount of hydrochloric acid initially mixed with the rock for loosening the apatite bond, the ultimate temperature of calcination, and the detention period, that is the time the rock is held at approximately the ultimate temperature of calcination. In practice, a detention period of 20 to 30 minutes is generally desirable and economic, and generally calcining temperatures within the range of 2500 and 2700° F. are preferred.

I claim:

1. The method of defluorinating by calcination phosphate rock containing fluorapatite, which comprises loosening the fluorapatite lattice prior to calcination by treating the phosphate rock with an aqueous solution of hydrochloric acid in amount of from 10 to 30% by weight of HCl based on the combined weight of rock and HCl, subjecting the treated rock to a drying operation at a temperature within the range of 200 to 800° F. in the course of which more than half of the hydrochloric acid admixed with the rock is volatilized, and calcining the dried rock without substantial fusion at a temperature of at least 2400° F. in the presence of water vapor and thereby producing a tricalcium phosphate product containing less than one part of fluorine for each 100 parts of phosphorus.

2. The method of defluorinating by calcination phosphate rock containing fluorapatite, which comprises loosening the fluorapatite lattice prior to calcination by treating the phosphate rock with an aqueous solution of hydrochloric acid in amount of from 10 to 30% by weight of HCl based on the combined weight of rock and HCl, subjecting the treated rock to a drying operation at a temperature within the range of 200 to 800° F. in the course of which more than half of the hydrochloric acid admixed with the rock is volatilized, crushing the dried rock to a size of substantially all through a 14-mesh screen, and calcining the dried and crushed rock without substantial fusion at a temperature of at least 2500° F. in the presence of water vapor and thereby producing a tricalcium phosphate product containing not more than 0.5% of fluorine and having a $P_2O_5$ solubility in neutral ammonium citrate of at least 75%.

3. The method of defluorinating by calcination phosphate rock containing fluorapatite and from 1.8 to 4.8% silica, which comprises loosening the fluorapatite lattice prior to calcination by treating the rock with an aqueous solution of hydrochloric acid in amount of from 10 to 30 by weight of HCl based on the combined weight of rock and HCl, subjecting the treated rock to a drying operation at a temperature within the range of 200 to 800° F. in the course of which more than half of the hydrochloric acid content of the treated rock is volatilized, crushing the dried rock to a size of substantially all through a 14-mesh screen, and calcining the dried and crushed rock without substantial fusion at a temperature of at least 2500° F. in the presence of water vapor and in the absence of any additive agent for increasing the refractoriness of the rock during calcination and thereby producing a tricalcium phosphate product containing not more than 0.5% of fluorine and having a $P_2O_5$ solubility in neutral ammonium citrate of at least 75%.

References Cited in the file of this patent

UNITED STATES PATENTS

| | | |
|---|---|---|
| 2,134,013 | Turrentine | Oct. 25, 1938 |
| 2,479,389 | Maust et al. | Aug. 16, 1949 |
| 2,504,446 | Plusje | Apr. 18, 1950 |
| 2,531,046 | Hollingsworth | Nov. 21, 1950 |
| 2,562,718 | Hollingsworth | July 31, 1951 |